US005173856A

United States Patent [19]

Purnell et al.

[11] Patent Number: 5,173,856

[45] Date of Patent: Dec. 22, 1992

[54] VEHICLE DATA RECORDING SYSTEM

[75] Inventors: Anthony J. Purnell, Cambridge; John C. Mumford, Comberton; Keith A. Bradbury, London; Raymond A. Wardell; Mark J. Broadbent, both of Cambridge, all of England

[73] Assignee: PI Research Limited, United Kingdom

[21] Appl. No.: 576,522

[22] PCT Filed: Jun. 2, 1989

[86] PCT No.: PCT/GB89/00611

§ 371 Date: Oct. 5, 1990

§ 102(e) Date: Oct. 5, 1990

[87] PCT Pub. No.: WO89/12279

PCT Pub. Date: Dec. 14, 1989

[30] Foreign Application Priority Data

Jun. 2, 1988 [GB] United Kingdom ................. 8813066

[51] Int. Cl.$^5$ .......................... G06F 15/74; G07C 5/10

[52] U.S. Cl. ............................ 364/424.04; 364/424.1; 364/551.01; 307/10.1; 340/425.5; 340/439; 340/516

[58] Field of Search ...................... 364/431.04, 431.03, 364/424.04, 424.05, 424.01, 424.03, 550, 551.01; 307/10.1; 342/44; 340/425.5, 438, 439, 459, 516, 556, 700, 715

[56] References Cited

U.S. PATENT DOCUMENTS

| | | | |
|---|---|---|---|
| 3,906,437 | 9/1975 | Brandwein et al. | 364/424.03 X |
| 4,236,215 | 11/1980 | Callahan et al. | 364/436 |
| 4,241,403 | 12/1980 | Schulte et al. | 364/424.04 X |
| 4,258,421 | 3/1981 | Juhasz et al. | 364/424.04 |
| 4,395,624 | 7/1983 | Wartski | 364/424.04 X |
| 4,442,424 | 4/1984 | Shirasaki et al. | 364/431.11 X |
| 4,551,725 | 11/1985 | Schaffer | 342/44 |
| 4,551,801 | 11/1985 | Sokol | 364/424.03 |
| 4,593,357 | 6/1986 | Van Ostrand et al. | |
| 4,823,367 | 4/1989 | Kreutzfeld | 340/556 X |
| 4,853,856 | 8/1989 | Hanway | 364/424.04 X |
| 4,926,331 | 5/1990 | Windle et al. | 364/424.04 |

FOREIGN PATENT DOCUMENTS 0074330 3/1983 European Pat. Off. .

OTHER PUBLICATIONS

N.T.I.S. Technical notes, No. 7, part B, Jul. 1986, "Microprocessor-Controlled Vehicle Performance Recorder".

AutoWeek, "Black Magic in '89 Lola Indycar", Jan. 30, 1989, p. 59.

*Primary Examiner*—Parshotam S. Lall

*Assistant Examiner*—Edward J. Pipala

*Attorney, Agent, or Firm*—Watson, Cole, Grindle & Watson

[57] ABSTRACT

A vehicle data recording system has connections to one or more analog sensors, and stores data from the sensor(s) in a memory during laps of a track. The system provides for analog/digital conversion for converting analog data from the sensor(s) into digital data, and triggers a procedure for storing of the data in memory. Periods of storing of the data in memory are automatically started and stopped. The system stores in memory a set of data for a datum period and has means for storing further sets of data in a memory. A set of data stored during a first period is compared with a set of data stored during a further period and one of the sets of data is selected for retention in memory in accordance with a predetermined algorithm. The retained set of data is compared with the datum set and differences between the datum set and the selected set are output.

7 Claims, 5 Drawing Sheets

*Fig. 2.*

Tamiami Park 1·78 miles
LAP:7 TIME 58·42 DATUM LAP 3
Overall Gain +4 mph
+0·2 sec
Straight Line speed 147 mph
-3 gain

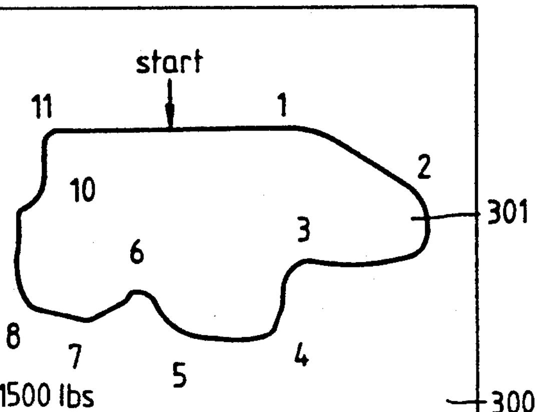

Change made New front springs 1500 lbs

300

Speed Changes (mph)

| SEGMENT # | TIME | SPEED |
|---|---|---|
| 1 | +0·28 | |
| 8-9 | +0·26 | 92 |
| 9 | -0·25 | |
| 3 OUT | -0·15 | |
| 6 IN | +0·06 | |

302

Lap Summary (Lap # 7)

| Corner Type | Total in circuit | Entry + | Entry - | Exit + | Exit - |
|---|---|---|---|---|---|
| Slow | 3 | - | 1 | - | 3 |
| Medium | 5 | 2 | 1 | 4 | - |
| Fast | 3 | 2 | - | 2 | - |

304

Engineers summary

*Better on just corners, but power understeer worst. Driver likes set up.*

"Speed Changes"

EACH CORNER IS NUMBERED AS ON THE CIRCUIT MAP. THE SYSTEM SELECTS THE 3 CORNERS AROUND WHICH THE BIGGEST GAINS OR LOSSES OCCURED AND PRINTS OUT DETAILS ON THESE. SUFFIX RELATES TO ENTRY OR EXIT.) PEAK SPEEDS BETWEEN BENDS ARE ALSO NOTED.

"Lap Summary"

THE PRINT OUT SHOWS HOW MANY CORNERS OF EACH TYPE WERE FASTER OR SLOWER. HERE, OF THE 5 MEDIUM SPEED BENDS, THE CAR WAS FASTER ON ENTRY TO 2 OF THE CORNERS, ON EXIT TO 4 AND SLOWER ON JUST ONE.

VEHICLE DATA RECORDING SYSTEM

The present invention relates to a vehicle recording system and, more particularly, to an on-board computer designed for racing cars.

In order to provide information to the driver, engineers etc. of a racing car team, it is desirable to record data relating to the movement, speed, and other operational factors for subsequent analysis.

According to the present invention there is provided a vehicle data recording system for connection to one or more analog sensors, and for storing data from the sensor(s) in a memory during a plurality of chosen periods, the system comprising:

- analog/digital conversion means for converting analog data from the sensor(s) into digital data;
- means for triggering a procedure for storing of the data into memory;
- means for automatically starting and ending periods of storing of the data in memory;
- means for storing in memory a set of data for a datum period;
- means for storing further sets of data in a memory;
- means for comparing a set of data stored during a first period with a set of data stored during a further period and selecting for retention in memory one of the sets of data in accordance with a predetermined algorithm; and,
- means for comparing said retained set of data with the datum set and outputting differences between said datum set and said selected set.

Preferably, the means for automatically starting and ending periods of storing of the data in memory comprises;

- a transmitter for transmitting a beacon signal;
- a receiver for monitoring for the presence of the beacon signal; and,
- means responsive to the receipt of the beacon signal to indicate the end of one set of data and the start of a further set. The means for triggering a procedure for storing of the data into memory may include a manually operable switch actuable by the driver of a vehicle in which the system is installed.

Furthermore, the means for displaying the differences between the datum set and the selected set may advantageously include a printer removably attachable to the system.

One example of a system according to the invention will now be described with reference to the accompanying drawings, in which:

FIG. 2 is an example of a lap report produced by the system;

Figure 1:
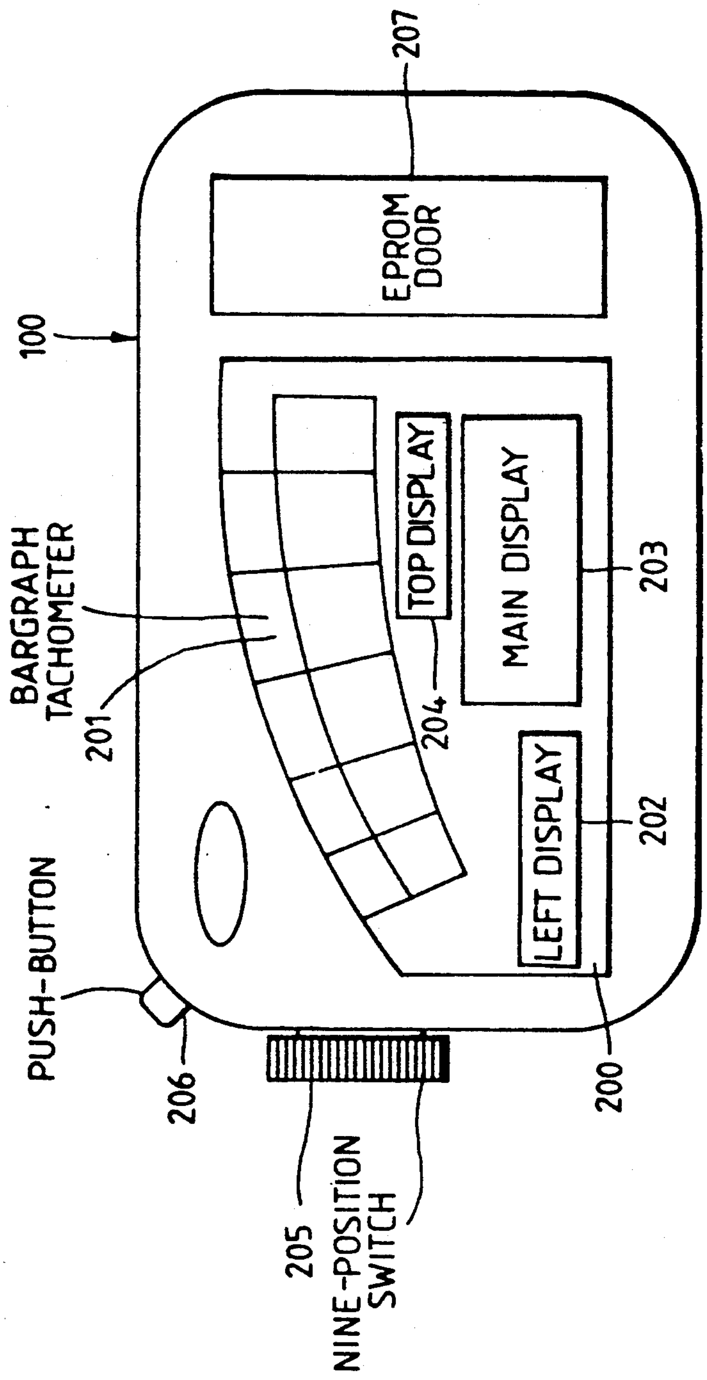
FIG. 1 is a diagrammatic representation of the front face of a display/processor unit of the system.
Figure 3A:
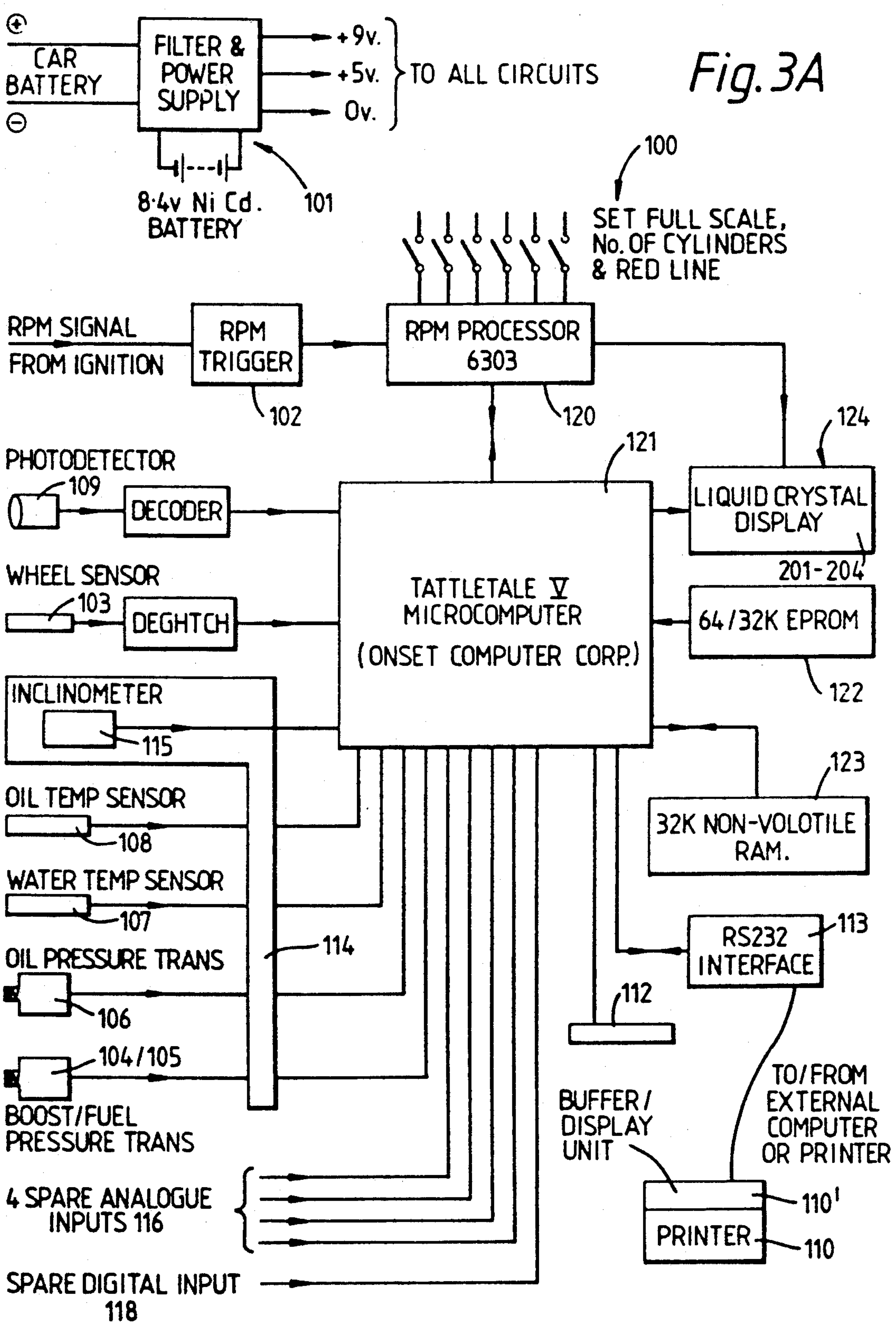
FIGS. 3A and 3B are diagrammatic representations of the system circuit and arrangement on a car; and, FIG. 4 is a flow diagram of the system in use.
Figure 3B:
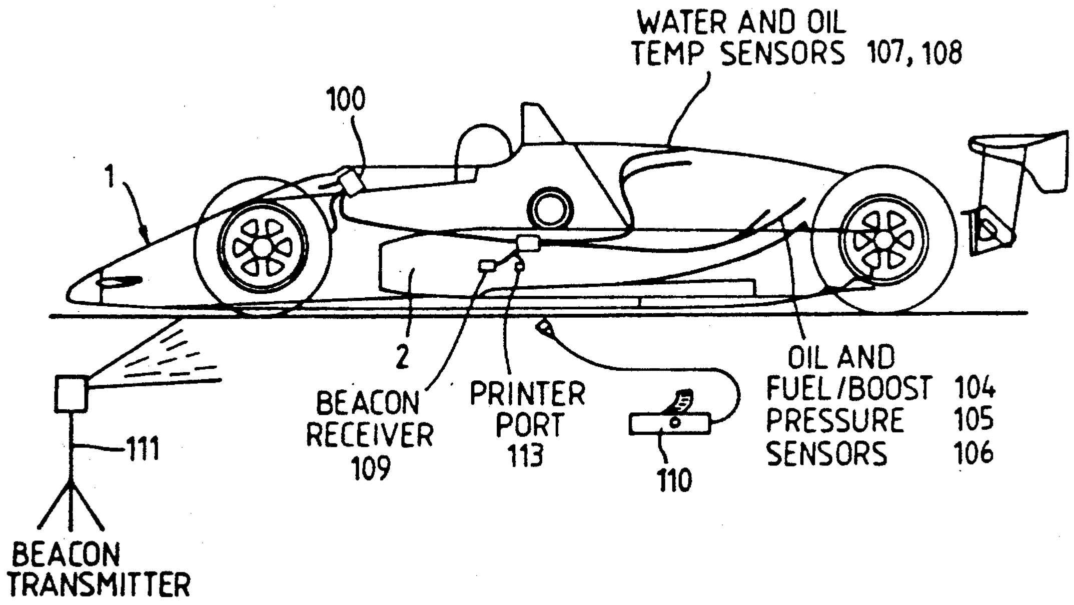

The electronic data recording system has three functions. Firstly, it provides all the facilities of conventional race car dash mounted instrumention, although with added features such as memory and automatic warnings. Secondly, it can be used as a data-logger capable of storing large quantities of information from many different types of sensors. Thirdly, the system can produce printed "lap reports" as soon as the car returns to the pit lane. These serve the purpose of quantifying mechanical changes in such a way so that the race engineer can see where on the track, and by how much, the car has gone quicker or slower after its set up has been altered.

The main display/processor unit 100, which houses most of the electronic components, also has an LCD display 124 which provides the driver with a tachometer 201 and three alphanumeric displays 202–204. A nine-position rotary switch 205 allows the user to switch between different display readings as required. Warnings are automatically issued by the system as necessary, for example a drop in oil pressure would trigger an alarm no matter what the display was set to read. Such warnings must be acknowledged by the driver before the display reverts to its previous reading.

The system can be used to log data continuously on plural independent channels (up to forty channels are possible with an expansion board added). The data acquired can be off-loaded from the system to a host personal computer. Software has been written to allow the user to analyze data at leisure on a personal computer should he so wish. The data is automatically divided into laps and can be displayed graphically. The graphs obtained can be expanded and overlaid for comparison.

The lap reports provide the race engineer and the driver with an assessment of the car's performance. This is primarily in terms of speed, although additional information on rpm, boost etc. may be provided. The reports are presented either in an absolute manner or in a form which compares one lap to another. The purpose of the lap report is to provide the race engineer with immediate information giving him a deeper insight into the manner in which engineering changes on the car have altered the car's performance. The onus is no longer on the driver to judge the relative merits of different set-ups. The instant availability of the necessary information allows more objectivity to be brought to bear on the task of optimizing the car's performance.

In order to enable enhancing and expanding upon the existing capabilities of the system the hardware design of the system has been implemented to allow for considerable expansion of software in the future. Thus, once the system is in place any updates or customizations to the system can be incorporated simply by changing an EPROM 123 (which stores the software to control the system). This is a totally straightforward process. In addition it is quite feasible to plug in electronically controlled devices so that the box can act as the 'brain' of an 'active' system in order to provide actual control of various engine management etc. functions.

Considering the system as a whole, the system offers a complete instrumentation and analysis system with in-built power and flexibility.

Hardware Description

The system is comprised of a display/processor unit 100 complete with power supply 101 and sensors for r.p.m 102, speed 103, pressure 104–106, temperature 107,108 and the 'beacon' 109; a printer 110; and a trackside beacon 111. The latter two items are used by the pit crew. The display/processor unit and its sensor peripherals are permanently attached to a car 1, the boost, fuel and oil pressure sensors 104–106, the water and oil temperature sensors 107,108, the beacon detector 109 and printer port 113 all being connected to the display/-processor unit through a slave box 114 which also houses an inclinometer 115. Spare analogue 116 and digital input lines are provided for additional sensors desired in a given car, e.g. ride height sensor, gearbox oil temperature, throttle angle. The main system is designed to be part of the race car, and not an add-on just for testing.

The rpm sensor 102 passes signals to an rpm processor 120 into which are set values to represent the full scale reading of rpm permissible, the number of engine cylinders and the 'red line' rpm point.

All other signals from sensors, together with a processed rpm signal are fed to a microcomputer 121 (in this example a 'Tattletale V form Onset Computer Corp.), which also has connections to an EPROM 122 and RAM 123.

The display/processor unit 100 is housed directly in front of the steering wheel and contains a small screen 200 consisting of a tachometer 201 and three alphanumeric displays 202–204 in addition to various other electronics components. On the left hand side of the box is a large rotary nine-position switch 205 which is used to select the various facilities of the system. On the top lefthand corner of the box is a push button 206 which the driver uses to control the chosen facility, for example to reset the lap counter to zero. On the righthand side of the front face of the box is a small rectangular door 207. The EPROM chip is situated behind this door.

When a full data logging test is required to be carried out an additional logging box can be connected into the system via a connector 112, signals from it being fed directly to the display/processor unit 100. Depending on the configuration of the test this box may have quite a number of sensors stemming from its ports, for example, strain guages, linear transducers, proximity sensors which may be used to measure accurately characteristics of the car such as suspension operation, ride height etc. The main use for such data logging is during development of a car.

The logging box is removable from the car when logging is not specifically required. A special lead is plugged into the display and logging boxes, connecting the two and allowing them to communicate. When the two boxes are connected in this way the driver or engineer can use the display/processor unit 100 controls to set parameters for the logging box. In turn, the logging box can send data to the display screen. The display/processor unit 100 also has four logging channels of its own. Thus some data logging can be performed without using the logging box, obviating the need to fit the logging box at all when performing simple tests.

The printer 110 also plugs into the display/processor unit 100 via a printer port 113 and the slave box 114 situated in the side of one of the car's sidepods 2. As the car 1 comes to a halt in the pit lane the engineer can simply plug the printer cable into the car's printer port 113 and the system will immediately print out a lap report.

An optional data buffer/display unit 110' may be connected to the printer port in place of (or as shown, in front of) the printer 110, and this includes a RAM to which data, which would normally be outputted by the system to the printer, can be stored temporarily and displayed/previewed on a liquid crystal display for instant analysis of results. The data can then be outputted to the printer 110 or to a personal computer for long term storage/analysis of the data. The attachment of the buffer/display unit 110' without the printer reduces waiting time at the trackside as data can be downloaded to the unit much more quickly than it can to a printer and also allows quicker feedback to the driver after analysis of the results on the display.

The beacon 111 is placed beside the track and transmits a signal (which in the present example is an infrared signal at a frequency of 950 nm, pulsed at 4 kHz and with a 1% duty cycle) which is received by the detector 109 each time the car passes the beacon. The detector contains an optical band pass filter at 950 nm±approx 20 nm, a high pass electrical filter and a circuit for determining a sequence of n pulses for which the spacing is ±2% of the normal pulse spacing. This enables the software from the EPROM to calculate lap times and to divide the data it has acquired into segments corresponding to one lap.

A personal computer (not shown) is used to analyze data logged by the logging box (or by the display/processor unit 100). The computer can be plugged into the system via the printer port 113 and the operator then uses the computer to transfer data from the system to the computer. Once transferred in this way the data can be stored permanently on the computer's hard or floppy disks and analysed at any time.

Basic Operation

The system is controlled by the user by means of the two switches 205,206 mounted on the display/processor unit 100. The rotary nine-position switch 205 enables the user to select the various instrumentation, lap report and data logging options, and the push-button switch 206 is used to set up and control these different options.

Each of the nine positions of the nine-position switch 205 corresponds to a function or set of functions. When the user selects a new switch position the current screen display is cleared and the screen displays show a message informing the user of the new position number. This message takes the form of the words "NOW AT" and the position number. The message is cleared after half a second and the selected display appears.

The push-button switch 206 can be used in three ways. Firstly, by pressing the button down momentarily, the user can either control the function which he has selected, or, if he has chosen a nine-position switch 205 setting with more than one option, switch between or select the functions in turn. Secondly, holding the switch down for more than one-and-a-half seconds but less than five seconds performs a RESET. This will set a given function to zero, for example the lap-counter. As soon as the word "RESET" appears in the lefthand text window 202 the switch may be released. Thirdly, holding the switch down for more than fifteen seconds performs a MASTER RESET. This allows a fundamental change to be implemented, for example the system's internal circuit map can be set up for a new race track by performing such a reset. After the switch has been held down for five seconds the display counts down from ten to zero. When the countdown reaches zero the word "MASTER" appears on the display followed by the word "RESET". If the switch is released before zero is reached (i.e. before fifteen seconds has elapsed in total), the system assumes that neither a RESET nor a MASTER RESET was intended and continues as if the switch had not been pressed. For some settings of the nine position switch 205 RESETS and/or MASTER RESETS are inappropriate and depressing the push-button switch 206 for extended periods will have no effect.

The Display

The display/processor unit 100 screen consists of an LCD display 124 which provides a tachometer 201 in the form of a bargraph and three alphanumeric displays 202–204. The tachometer 201 is permanently on. The three alphanumeric displays are referred to throughout as the main display, the top display and the lefthand display as shown in FIG. 1. These convey information to the user either in combination with one another or independently depending on the selected function. The user can also if he wishes have them remain blank.

Instrumentation

This section describes the ways in which the system fulfils the function of an instrumentation system. The bar-graph tachometer 201 is permanently on. The three alphanumeric displays 202–204 provide information as determined by the driver's use of the display/processor unit switches. The driver can choose to look at various readings by selecting certain settings of the nine-position switch 205. In addition the system automatically generates warnings when critical conditions occur, for example when the water temperature rises to too high a level.

Switch Position One—Timer, Stopwatch and Lap Counter

The screen displays a stopwatch, a timer to time qualifying sessions and a lap counter. The stopwatch uses the main display 203, the lap counter the top display 204 and the session timer the lefthand display 202.

The stopwatch automatically times each lap and is triggered and reset by the trackside beacon 111. The lap time, displayed in minutes, seconds and hundredths of a second, is updated as soon as the car passes the beacon. Thus at any given time the lap time of the previous lap is shown.

The lap counter and the timer are controlled together. Initially the lefthand display 202 shows the text "TIMER" and the top display 204 shows the text "LAP 0". One press of the push-button switch 206 erases the "TIMER" message and starts both the lap counter and timer from zero. The next press of the switch resets them to zero and restarts them. Once started the lap counter is incremented each time the car passes the beacon and the session timer counts the minutes since the restart. The lap counter will count up to a maximum of 999 laps.

A RESET resets both the timer and the lap counter to zero without restarting them. The initial text messages "TIMER" and "LAP 0" are displayed. The stopwatch is reset to zero but continues to be triggered and reset by the beacon. A MASTER RESET in this setting of the nine-position switch 205 will have no effect.

The lap counter and the timer will both continue to function even if the nine-position switch 205 is moved from position one. Their respective displays will reappear showing their current values if the nine-position switch 205 is subsequently turned back to position one.

The initial screen will be seen the first time that the user turns to switch position one after switching the system on or performing a MASTER RESET (when in another switch position), as well as after a RESET performed in switch position one.

Switch Position Two—Core Instrument Readings

Switch position two allows the driver or the race engineer to check the four core readings: water temperature, oil temperature, oil pressure and fuel pressure (boost in the case of turbo-charged cars).

The lefthand display 202 reads "WATER", "OIL-T", "OIL-P", "FUEL" (or "BOOST") as appropriate. The top display 204 shows an appropriate maximum or minimum reading by which to judge the current reading. These maxima and minima are described below. The main display shows the current reading in engineering units. The water and oil temperatures are shown in degrees centigrade, the oil and fuel pressures in PSI and the boost pressure in inches of mercury.

The driver or the engineer can switch between the four readings by pressing the push-button switch 206. Each press of the switch selects the next reading in turn, the display sequence cycling back to water temperature after fuel/boost pressure.

Water Temperature

The top display 204 shows to the nearest integer the maximum water temperature in degrees centigrade so far encountered. When the car stops and restarts the maximum is updated to the current reading after one minute to allow for the rise in water temperature whilst the car was stationary. Updating of the maximum is disabled while the car is stationary. The main display shows the current water temperature to the nearest degree centigrade.

Oil Temperature

The top display 204 shows to the nearest integer the maximum oil temperature in degrees centigrade so far encountered. When the car stops and restarts the maximum is updated to the current reading after one minute, as in the case of the water temperature, to allow for the rise in oil temperature whilst the car was stationary. Updating of the maximum is disabled while the car is stationary. The main display 203 shows the current oil temperature to the nearest degree centigrade.

Oil Pressure

The top display 204 shows to the nearest integer the minimum oil pressure in PSI so far recorded with the engine running at more than 8000 RPM since the system was switched on. This display is active continuously. The main display 203 shows the current oil pressure in PSI to the nearest integer.

Fuel Pressure

The top display 204 shows to the nearest integer the minimum fuel pressure in PSI so far recorded with the engine running at more than 750 RPM since the system was switched on. This display is active continuously. The main display 203 shows the current fuel pressure in PSI to the nearest integer.

Boost Pressure

The top display 204 shows to the nearest integer the minimum boost pressure in PSI times ten so far recorded with the engine running at more than 8000 RPM since the system was switched on. This display is not active whilst the car is stationary. The main display 203 shows the current boost pressure to the nearest tenth of a PSI.

Switch Position Three—Speed Information/Clear Screen

This switch position has two options. The first option relays information on the car's speed, the second option clears the top and main display 203s leaving the driver with no distractions. The driver can switch between the two options by pressing the push-button switch 206.

Option One—Speed Information

The lefthand display 202 shows the text "SPEED", the top display 204 shows the fastest speed attained on the previous lap and the main display 203 shows local speed maxima and minima to the nearest tenth of a MPH. Displaying the most recent maximum and minimum speeds gives the driver a measure of how well he has taken a corner. As soon as the car's speed begins to increase after the slowest part of a corner the minimum speed reached is displayed. Subsequently, as soon as the car's speed begins to decrease after peaking on the following straight, the maximum speed attained is displayed.

Option Two—Clear Screen

In this mode the top and main display 203s are blank while the lefthand display 202 shows appropriate text. Thus the driver has no distractions.

Switch Position Four—Analog Readings

This switch position allows the user to inspect the readings from the display/processor unit's analog input channels. The lefthand display 202 contains text identifying the input, the main display 203 shows the reading and the top display 204 is blank. The user switches between the readings by pressing the push-button switch 206. The various readings are described below. In this switch position RESET and MASTER RESET are not enabled. The readings displayed are sampled and updated five times a second.

Battery Level

The lefthand display 202 reads "VOLTS". The main display 203 shows the battery voltage to the nearest tenth of a volt.

Box Temperature

The lefthand display 202 reads "TEMP". The main display 203 shows the system's internal temperature to the nearest degree centigrade.

'Gyroscope'

The lefthand display 202 reads "GYRO". The main display 203 shows the internal 'gyro' (used for automatically obtain a map of the track for the lap report) reading on a scale of 0 to 1023.

Front Right Ride Height

The lefthand dislay reads "FT-1". The main display 203 shows the front right ride height on a scale of 0–1023.

Front Left Ride Height

The lefthand dislay reads "FT-2". The main display 203 shows the front left ride height on a scale of 0–1023.

Rear Right Ride Height

The lefthand dislay reads "Rr-1". The main display 203 shows the rear right ride height on a scale of 0–1023.

Rear Left Ride Height

The lefthand dislay reads "Rr-2". The main display 203 shows the rear left ride height on a scale of 0–1023.

Warnings

The system continually monitors the four core readings and the battery level. A warning is issued to the driver should any of the following conditions occur:

1) Oil pressure too low.
2) Water temperature too high.
3) Oil temperature too high.
4) Boost or fuel pressure too low.
5) Battery level too low.

When one of these conditions is detected the display is instantly cleared and the problem reading is then automatically shown to the driver so that he can monitor its progress. The lefthand display 202 contains text identifying the critical reading. Hence this will say either "WATER", "OIL-T", "OIL-P", "FUEL", "BOOST" or "VOLTS". The main display 203 shows the reading. The reading is constantly updated until the driver acknowledges the fault by pressing the push-button switch 206. The system then raises or lowers the appropriate threshhold value so that a further warning will not be issued until a further deterioration of the condition has taken place. The previous display is then restored. Should two or more warning conditions occur simultaneously, they are processed according to the order of precedence shown above. When one warning is acknowledged the next is displayed.

The threshhold values in comparison with which these warnings are issued can be set using switch position five.

Switch Position Five—Setting the Threshold Values

This switch position allows the user to change threshhold values associated with the system warnings. The threshhold values that may be altered are maximum water temperature, maximum oil temperature, minimum oil pressure and minimum boost pressure. A MASTER RESET transfers control to a host personal computer which is connected via the cable plugged into the car's printer port 113. The host computer is then used to alter the threshhold values as desired. A RESET allows the user to dispense with any changes to these values that have been made and revert to the original values.

Switch Position Six—Calibration

This switch position is used when calibration or recalibration of sensors is required, for example, after replacement of a worn or damaged sensor.

Switch Position Seven—Road speed

This switch position simply allows the main display 203 to show the actual instantaneous speed of the car over the road surface, thus functioning as an additional or alternative speedometer.

The Lap Report

The purpose of the lap report is to provide the race engineer with immediately available information on the way in which engineering changes made to the car have affected the car's performance. The system can produce six different types of lap report according to the needs of the engineer. The system references changes in the car's performance to a previous fast lap of the circuit, known as the datum lap, using an internal map of the circuit which it automatically obtains on the first outing at a new venue. In order to furnish the system with an internal image of the circuit the initialisation procedure described below must be carried out. The report produced is always of the fastest lap of the most recently completed outing, an 'outing' being an uninterrupted sequence of laps.

Figure 4:
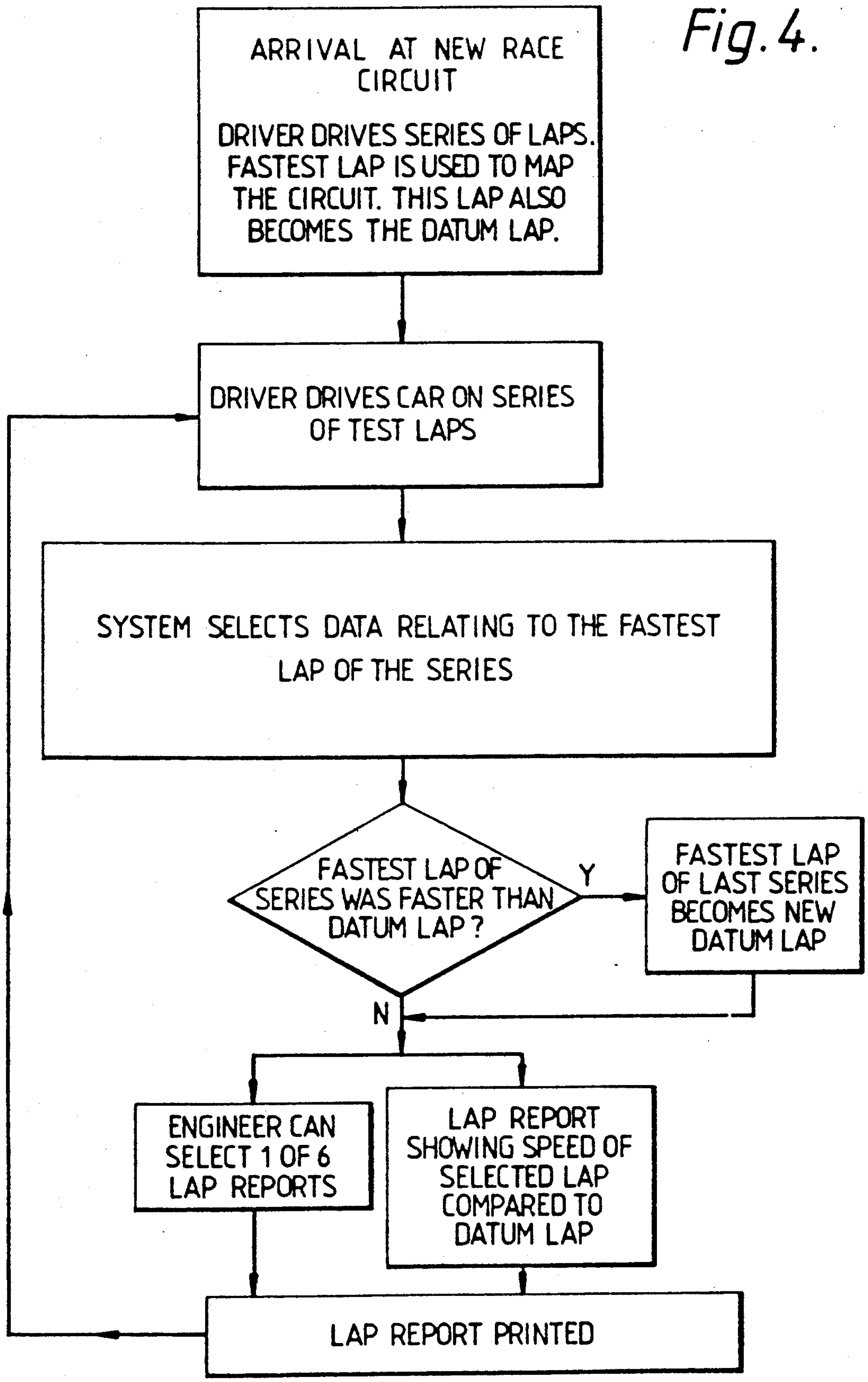

FIG. 4 is a flow diagram of the steps involved.

On arrival at a new race track the first task to be accomplished is to set the two parameters necessary for the lap reporter to function—the wheel circumference and the number of corners on the circuit. These are set using switch position eight. The user performs a MASTER RESET and then selects the appropriate value for each parameter by pressing the push-button switch 206 as the display cycles through the possible values of each parameter. This is described in more detail below. The driver then drives the car round the track, aiming to achieve a fast lap on the racing line with no extraneous turns or swerves (e.g. overtaking manoeuvres). This lap is known as the mapping lap and enables the computer to form its internal image of the circuit. When he has driven a suitable lap he should straightaway press the push-button before bringing the car to a halt. Pressing the button while the car is in motion selects the most recent, completed lap as the mapping lap. Pressing the button after the car has stopped selects the fastest lap so far as the mapping lap. As soon as the mapping lap has been set and the car has returned to the pit lane, the race engineer plugs the printer 110 or printer buffer/display 110' in to the printer port 113 and obtains the mapping data sheet described below.

The Datum Lap

Of the six available types of lap report, two, including the standard lap report, present the data relative to a previous lap known as the datum lap. The system automatically selects the fastest previous lap as the datum lap, updating it every time the driver drives a faster lap. However, there are situations in which this is not appropriate, for example if it has been raining, and so the facility exists to either prevent a new fastest lap from becoming the datum lap or to force a less fast lap to become the new datum lap. This involves using switch position eight and pressing the push-button switch 206 in response to the prompts "VETO?" and "FORCE?" respectively. This is described in more detail below.

Switch Position Eight—Setting Lap Report Parameters And Choosing The Datum Lap To set the lap report parameters the user switches to switch position eight and performs a MASTER RESET. The system responds with the message "SET UP REPORT", the text "SET UP" appearing in the top display 204 and the text "REPORT" appearing in the lefthand display 202. The user responds by pressing the push-button switch 206. The message "FIX BENDS" then appears, the text "FIX" in the lefthand window, the text "BENDS" in the top window. In the main display 203 a counting sequence is started, beginning at three and going up to twenty-five. Each number remains on the display for one second. The user presses the push-button switch 206 when the number corresponding to the number of corners on the circuit appears. If no number is selected by the user the counting sequence restarts from three again. When the user has selected the number of bends the message "FIX WHEEL" appears, the text "FIX" in the lefthand display 202 and the text "WHEEL" in the top display 204. Again a counting sequence appears in the main display 203. The user presses the push-button switch 206 when the appropriate wheel circumference measurement appears on the screen. The screen then flashes several times before displaying the message "SET MAP", the text "SET" in the lefthand display 202, the text "MAP" in the top display 204. The driver then attempts to drive a suitable mapping lap. When he is satisfied that he has driven a suitable lap he can make it become the mapping lap by pressing the push-button switch 206. If the switch is pressed while the car is still in motion the most recently completed lap becomes the mapping lap. If the car has come to a halt before the driver presses the switch, pressing the switch selects the fastest lap driven since the MASTER RESET as the mapping lap.

The datum lap is normally the fastest lap driven so far. If on his most recent outing the driver drives a faster lap, the lap report produced will be relative to the old datum lap but the new, faster lap will automatically become the new datum lap. The engineer can use switch position eight to override this process.

If the fastest lap on the most recent outing was faster than the datum lap, turning to switch position eight yields the following: the lefthand display 202 shows "LAP nn" where nn is the lap number of the last lap, the main display 203 contains the lap time of the new fastest lap and the top display 204 shows the text "VETO?". Pressing the push-button switch 206 prevents the new fastest lap from becoming the datum lap, and the message "VETOED" appears in the top display 204.

Alternatively, if the fastest lap on the most recently completed outing was slower than the present datum lap, turning to switch position eight yields the following: the lefthand display 202 shows the lap number as above, the main display 203 shows the lap time of the fastest lap of the most recently completed outing, and the top display 204 contains the text "FORCE?". Pressing the push-button switch 206 makes this lap, the fastest of the most recent outing, the new datum lap. The message "FORCED" appears in the top display 204.

A RESET in this switch position changes the screen, showing the text "DATUM", in the top display 204, the lap number of the lap on which the current datum lap time was set in the lefthand display 202 and the datum lap time in the main display 203. This screen display lasts for five seconds, then the previous information reappears. This last display format is also what one will see in switch position eight after the outing on which the mapping lap has been set, since there are no previous outings for comparison.

The Mapping Data Sheet

When the car comes to a halt after the outing on which the mapping lap has been set the engineer can obtain a printout showing the way in which the system has chosen to divide the track into segments. A segment consists of either a corner or the straight between two corners. For each segment the following information is given: the length of the segment in meters, the time taken for the car to cover the segment, the maximum or minimum speed for straights and corners respectively, and the segment type. Segments are classified as either straights, fast corners, medium corners or slow corners. The engineer may then use this information to supplement that shown on the pre-printed sheet. To obtain this printout the user loads the printer with a plain piece of A5 paper and plugs the printer cable into the car's printer port 113 ot the buffer/display unit 110'. Printing proceeds automatically.

The Pre-Printed Sheet

The standard lap report (see FIG. 2) is printed on a pre-printed sheet 300. This sheet shows a map 301 of the circuit with the corners numbered and has sections in which the system prints speed changes 302 and a lap summary 303. The total lap time and the straight-line speed are shown and compared with those of the datum lap. There is also a space set aside for the engineers handwritten comments.

In the speed change section the system lists in order of magnitude the five most significant speed changes on the lap relative to the datum lap. These may be on straight segments, corner segments or on entry or exit to corner segments. Corner entry and exit times are denoted by the suffixes IN and OUT respectively.

In the lap summary section the number of speed gains on entry and exit to corners of each type is printed.

Obtaining The Standard Lap Report

Obtaining the standard lap report is a straightforward process providing the mapping lap has been set. The printer is loaded with a pre-printed lap report sheet. As the car comes to a halt in the pit lane after an outing, the user simply plugs the printer cable into the car's printer port 113. Alternatively, the printer buffer/display 110' is plugged in to the port 113 and data transferred to it, the printer later being plugged into the unit 110'. Printing then takes place automatically.

The Different Types Of Lap Report

The system prints out (or displays on the printer buffer/display) a report on the fastest lap of the most recent outing in the form selected by the user. The engineer can select the desired form using switch position nine. To obtain the standard lap report it is not necessary to switch to position nine. However, if for example a second copy of it is required, it can be obtained using switch position nine. Only the standard lap report (option one) uses the pre-printed sheet. For all other types of lap report the printer must first be loaded with a plain sheet of A5 paper before the printer cable is plugged into the printer port 113. The choices of lap report are are as follows:

1) "LAP-R"

Report showing times and speeds of fastest lap of last outing relative to the datum lap. (The standard lap report).

2) "LAP-A"

Report showing actual times and speeds of fastest lap of last outing.

3) "Spd-R"

Graph showing speed versus distance for fastest lap of last outing relative to the datum lap.

4) "Spd-A"

Graph showing actual speed versus distance for fastest lap of last outing.

5) "RPM"

Graph showing RPM versus distance on fastest lap of last outing.

6) "BOOST"

Graph of boost pressure versus distance on fastest lap of last outing (if desired).

Switch Position Nine—Selecting The Lap Report Format

In switch position nine the left hand display cycles through the available choices (LAP-R, LAP-A etc. as listed above) displaying each for one second. To select the desired format the user presses the push-button switch 206 while the required option is showing. The main display 203 then flashes until the printer is plugged in or the nine-position switch 205 setting is changed. When printing is completed the left hand display again cycles through the available choices.

The Push-Button Switch

The push-button 206 switch located on the top left hand side is used in a number of different ways:

(a) A 'click'

In the majority of cases the button is just pressed down momentarily in order to make a selection or to page through the different options available on each setting of the nine-position switch 205. The moment the button is pushed down, the lower left display changes from whatever text it is presently owing to just a line; '————'. This gives the operator feedback that the press has worked ok. If the button is released within 1.5 seconds the computer interprets the press as a momentary press.

(b) A 'RESET'

Sometimes it is necessary to reset a certain function, for instance when the system is counting laps and it is required to reset the counter back to zero. This is achieved simply by holding the button down for as long as it takes the word 'RESET' to appear in the left hand text window.

In order for the system to tell the difference between a momentary press and a long 'reset' press the software constantly monitors the switch. If it detects a transition from switch up to switch down it first clears the left display and then sets a timer in motion, a transition from down to up halts the timer. If the timer reads less than 1.5 seconds the system interprets the press as a momentary one. If greater than 1.5 seconds a 'reset' press is assumed and 'RESET' is sent to the display. A little practise makes the difference clear. This form of switch press is only appropriate to some of the available options.

(c) A 'MASTER RESET'

There is one additional type of press, only used when very deliberate action is required, for instance when it is needed to tell the system that the next run is at a new circuit. This is called a master reset and is only appropriate to a few settings. Here one holds the button down for a full 30 seconds before releasing. The display will show 'RESET' in the left hand display, and after about 5 seconds the main display 203 will start to count down to zero at one second intervals. If the button is released at any time while the count down is showing it is as though the button had never been pressed at all. (Thus giving a way out if one changes one's mind about giving the machine a normal reset.) If one persists the count will eventually reach zero, the display will flash 'MASTER' and then 'RESET', and a master reset will have been achieved. As with a normal 'RESET' the master reset is only appropriate to certain options.

We claim:

1. A vehicle data recording system for connecting to at least one analog sensor on the vehicle, and for storing sets of data therefrom during a plurality of chosen periods of operation on a course, the system comprising:

an analog/digital converter responsively coupled to the at least one sensor for converting analog data therefrom into digital data;

a memory responsively coupled to the analog/digital converter for storing the digital data;

gating means operatively coupled to the memory for initiating storage of the data into said memory;

means partly on the course and partly on the vehicle and operatively coupled to the memory for initiating start and end signals for respectively starting and ending periods of storing of the corresponding set of data in the memory;

means operatively coupled to the memory for selectively storing in the memory a set of said data for a datum period;

means operatively coupled to the memory for storing further sets of data in the memory;

means responsively coupled to the memory for comparing a set of data stored during a first period with a set of data stored during a further period and selecting for retention in memory one of the sets of data in accordance with a predetermined criterion; and, means responsively coupled to the memory for comparing said retained set of data with the datum set and outputting differences between said datum set and said selected set.

2. A system according to claim 1, wherein the means for initiating start and end signals for respectively starting and ending the periods of storing the data in memory comprises:

a transmitter on the course for transmitting a beacon signal;

a receiver on the vehicle for monitoring for the presence of the beacon signal; and means responsive to the receipt of the beacon signal to indicate the end of one set of data and the start of a second set of data.

3. A system according to claim 1, wherein the gating means includes a manually operable switch actuable by the driver of a vehicle in which the system is installed.

4. A system according to claim 1, wherein the means for outputting the differences between the datum set and the selected set includes a printer removably attachable to the system.

5. A system according to claim 1, wherein the means for outputting the differences between the datum set and the selected set includes a data buffer/display unit which includes a RAM for storing data temporarily and for at least one of displaying and previewing on an integral liquid crystal display and outputting to a printer and computer.

6. A vehicle dashboard instrumentation system in which a plurality of vehicle mounted sensors are adapted to generate respective data comprising:

a data memory responsive to the sensors for storing the data in a plurality of classes during corresponding periods;

display means responsively coupled to the memory operative for displaying said data;

selector means operatively coupled to the memory operative for selecting which of said classes of data is displayed by said display means;

initiator means operatively coupled to the memory for initiating storage of a plurality of sets of said classes of data in said memory during a plurality of said corresponding periods;

means operatively coupled to the memory operative for starting and ending individual ones of said periods of storing said sets of data in memory;

means responsively coupled to the memory operative for retaining in memory a datum set of data for a datum period;

means responsively coupled to the memory operative for comparing a first set of data stored during a first period with a second set of data stored during a second period and selecting and retaining in memory at least one of the first and second sets of data; and, means responsively coupled to the memory operative for comparing said retained set of data with the retained datum set and outputting and displaying differences between said datum set and said selected set.

7. A vehicle data recording system, for connection to at least one sensor on the vehicle and for storing sets of data therefrom during a plurality of corresponding lap periods of recurring operation on a course comprising:

a memory for receiving the data;

signaling means partly locatable in the vehicle and partly locatable on the course at a position for producing an indication each time the vehicle has passed said position;

a gate responsive to the indication of said signaling means operatively coupled to the memory for initiating and terminating selected periods for storage of a set of data into the memory for the corresponding lap period each time the vehicle passes said position;

a plurality of memory locations in said memory for storing a set of data for each corresponding lap period;

a selector coupled to the memory for selecting a datum period from said lap periods;

a comparator responsively coupled to the memory for comparing data from the lap periods with the data from the datum period and for producing an output indicative of a difference therebetween, said comparator operatively coupled to the selector for updating the datum period.

* * * * *